May 22, 1962    W. M. LOWE ETAL    3,035,810
SEALING VALVES FOR GAS CONTROL
Filed June 25, 1958    9 Sheets-Sheet 1

INVENTORS:
WALTER MAX LOWE
FREDERICK SCQUIRREL

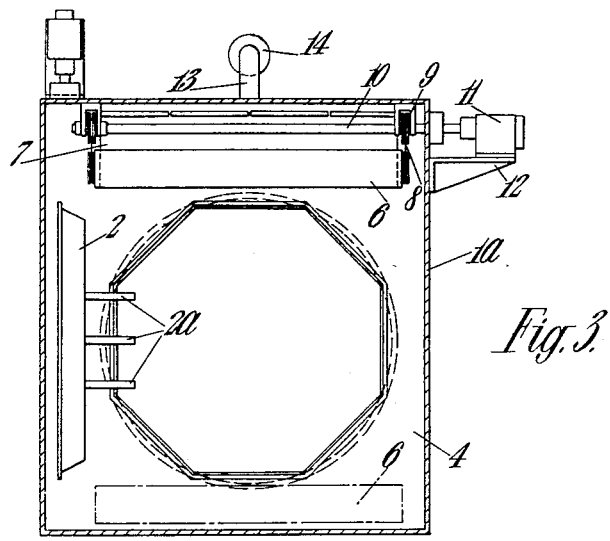

INVENTORS:
WALTER MAX LOWE
FREDERICK SQUIRREL

May 22, 1962 W. M. LOWE ETAL 3,035,810
SEALING VALVES FOR GAS CONTROL
Filed June 25, 1958 9 Sheets-Sheet 4

INVENTORS
WALTER MAX LOWE
FREDERICK SQUIRREL

INVENTORS:
WALTER MAX LOWE
FREDERICK SQUIRREL

May 22, 1962  W. M. LOWE ETAL  3,035,810
SEALING VALVES FOR GAS CONTROL
Filed June 25, 1958  9 Sheets-Sheet 7

INVENTORS:
WALTER MAX LOWE
FREDERICK SQUIRREL

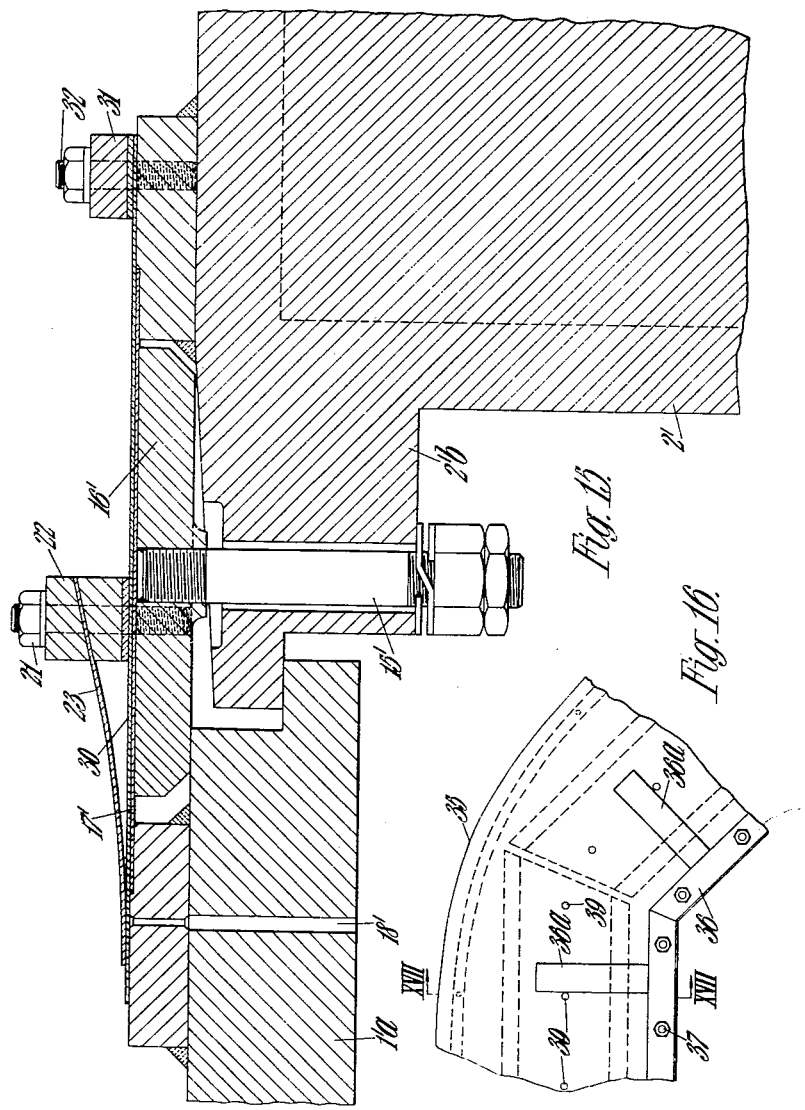

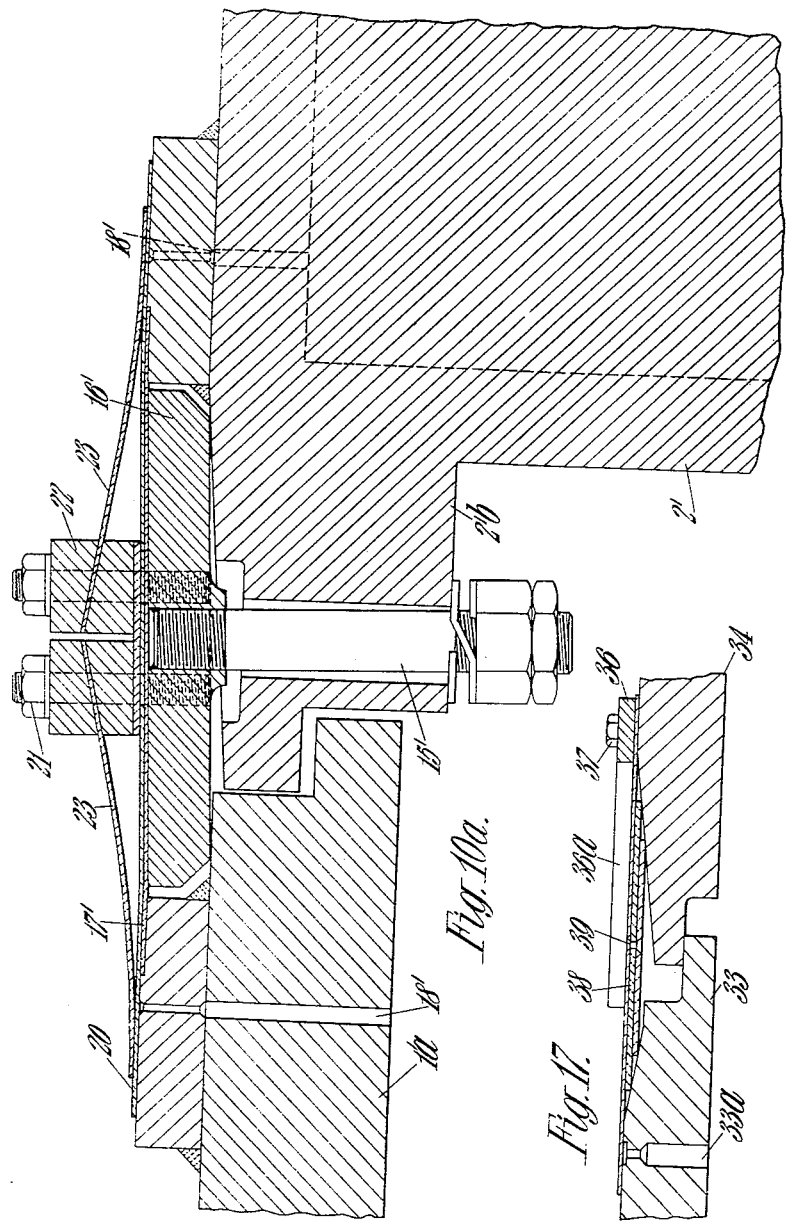

United States Patent Office 3,035,810
Patented May 22, 1962

3,035,810
SEALING VALVES FOR GAS CONTROL
Walter Max Lowe and Frederick Squirrel, London, England, assignors to Thermo-Technical Development Limited, London, England
Filed June 25, 1958, Ser. No. 744,560
Claims priority, application Great Britain July 1, 1957
11 Claims. (Cl. 251—298)

This invention relates to a gas-tight closure device for ducts of large cross-section.

The gas-tight closure of ducts having a large cross-sectional area handling hot gases and other fluids under medium and high pressure presents particular difficulties. The great forces exerted by expansion and contraction, vibration and other causes, lead to distortion and misalignment of the valves which result in gaps and consequent great residual leakage, or they prevent full closure altogether. The need for solving this particular problem has become particularly urgent in conjunction with gas-cooled nuclear reactors where great volumes of hot gases under high pressure and with some dust content have to be handled. Here the provision for safe and quick isolation of any particular gas circuit is of vital importance for the uninterrupted availability of the reactor and for continuous power production.

The conventional medium- and high-pressure valves have not proved a satisfactory proposition. Their sealing involves the meeting of straight, often machined, rigid surfaces sealing on each other tightly when closing. Any distortion of these surfaces or slight dust accumulation would defeat their purpose and must be avoided at all costs. These conditions are easily met with when closing pipes with relatively small cross-sectional area, but with increasing size a quickly rising degree of distortion becomes unavoidable and leads to the above described difficulties. To minimise these defects the tendency has been to increase strength and rigidity of the valve bodies and moving parts in order to render them dimensionally more stable.

On the other hand, various designs have been developed for the gas-tight sealing of ducts up to very large cross sections but operating under low pressure differentials, such as the flues of boilers and furnaces. Here the problem is to accommodate fairly large distortions and misalignments without impairing the seal. However, these sealing devices using flexible or resilient members, could only operate satisfactorily as long as they are subjected to a relatively low pressure differential, such as encountered in flues and similar ducts. Any increase of pressure beyond a rather low limit (say beyond 30 to 40 inches water gauge) would create new problems unsoluble for the designs proposed so far in this field. For, when a certain pressure differential is surpassed, the resilient members would most likely be penetrated and destroyed or simply be blown out, or distorted beyond re-usable limits. Where flexible members are used such as curtains or strips of spring tempered metal, they would either be blown out or destroyed by distortion. Any attempt to solve the problem within the limits of the inventions shown so far, i.e. by simply strengthening the flexible members, would be frustrated by the indicated operating conditions, for to make these members strong enough to resist destruction by the high pressures involved, their thickness would have to be increased to such a degree as to render them relatively inflexible, thereby introducing the same difficulties as encountered with conventional valves, and described above.

The invention consists of a gas-tight swivel valve for ducts of comparatively large cross-section carrying gas under pressure, and is characterised by having at least two closing or sealing elements which lie one on top of another. The first of these elements on the pressure side is a diaphragm providing a continuous seal and the other closing element is designed in such a manner that it will secure, independent of unavoidable local level differences between the valve body and the valve, a seating for the diaphragm which is free from any sudden changes of level, therefore assuring that the diaphragm when pressed tightly on to this seating, is not subjected to bending stresses which could cause a permanent local distortion of the diaphragm.

The diaphragm could consist of pliable material having a spring temper, preferably of suitable sheet metal, thin enough to accommodate the expected surface curves and changes without any permanent distortion, strong enough to withstand the maximum pressure where it has to seal against it, and elastic enough to return to its original shape after removal from the sealing position.

While the diaphragm is preferably formed in one continuous sheet it could be made up of overlapping sheets.

In one embodiment of the invention, the diaphragm forms an element of the valve construction which can be removed from the path of the valve, for instance, in the manner of a roller curtain.

In another embodiment of the invention, the diaphragm can be carried by or could be fixed to the valve or to one of the other successive closing or sealing elements associated with the moving valve thus forming part of the valve assembly.

In an alternative embodiment the sealing diaphragm could be fixed to the division plate or frame forming part of the valve body or one of the other successive sealing elements associated with it.

If one of the latter two alternatives is used, the sealing diaphragm may be of laminated construction in order to prevent over-stressing under the effect of the velocity head when approaching the closed position.

In a valve in accordance with the invention, there may be incorporated, at least in the plane of the valve body overlapped by the outer margin of the diaphragm, a zone annular in its effect in which the diaphragm is pressed against its seating by the differential pressure acting on both sides of the valve (hereinafter referred to as suction seals or pressure seals).

Should the diaphragm have an inner opening, a similar zone may be provided in the disc valve overlapped by the inner margin of the diaphragm. Additional zones or recesses may be provided on the faces of the valve body and of the disc valve underlying the diaphragm in order to control the straight seating of the diaphragm under pressure.

These pressure seals may consist of connecting holes between the high pressure and low pressure faces of the valve body respectively, of the moving valve part, or both.

These holes may be connected with each other, e.g. by a recess, or recesses might be provided in the surface of the valve facing towards the high pressure side, which are connected with the low pressure side of the valve or valve body.

In order to control the sealing action as soon as the sealing diaphragm approaches the suction seal, the sealing margin of the diaphragm may be controlled mechanically, for instance by means of bias springs pressing the outer edge of the diaphragm somewhat forward in the sealing direction so that the sealing contact is made first with the outer edge of the diaphragm.

A similar effect will be produced by slightly raising the sealing face which the diaphragm is approaching in its closing movement. In this case the annular sealing face within the raised portion on which the diaphragm will seal under pressure will have to have a radius seal cross-section with a curvature within the stress limits of the diaphragm material.

In both cases, as soon as the diaphrgam edge contacts its sealing space will be exhausted through the suction or pressure seal and the the diaphragm will come down smoothly on its seating. The sealing diaphragm has to be large enough to overlap the pressure seal incorporated in the valve body, and if the diaphragm has a central opening, to overlap with the pressure seal incorporated in the swivel valve itself and sufficient margin beyond the pressure seals.

The valve body comprises a frame or dividing plate with an opening roughly equivalent to the duct cross-section which is to be closed by a swivel valve. The preferred construction of this swivel valve is a laterally pivoted flap or door member resting, when fully closed, and under pressure, on projections or on a projecting rim of the frame. This will have the result that under the great pressure loads to which frame and swivel valve are subjected these will settle on each other thereby minimising relative local misalignment of both edges, without regard to any general distortion of the system. Moreover, this design will have the advantage that the great pressure load on the swivelling element is distributed over the whole rim of the frame instead of the load being localised at and carried by the shaft and the bearings, as with a balanced louvre.

In order to provide a relatively flat and smooth surface on which the sealing diaphragm can settle under pressure without damage in alternative forms of this invention where the diaphragm covers the whole or nearly the whole of the high pressure face of the swivel valve, the hinge in this invention is placed on the opposite side to conventional laterally pivoted swivelling closing elements, i.e. on the closing or downstream side. This position may be used for other forms since this position offers the advantage that with closed valves all moving parts and the spindle and bearings are fully accessible for servicing if required and bearings are situated on the atmospheric side and are thus fully accessible.

While the forward, i.e. closing, movement of the swivel valve is limited by the projections or the rim of the frame, a wide clearance between frame and swivel valve can be provided to take up any lateral deformations which might occur.

In order to even out (or compensate for) local level differences between surfaces of the valve body and the valve facing the diaphragm, each one may be provided at their edges facing each other with a stop which is so formed that it can be substantially filled in by bridging elements fixed to the valve, the diaphragm or the dividing plate of the valve body in a manner permitting their swivelling movement around a pivoting zone situated at the inner area of the step, one side of the bridging element is resting on a step provided in the dividing plate aperture of the valve body and the other resting on a step provided on the valve. The thickness of the bridging element is suitably so dimensioned that it is equal to the distance from its supporting surface to the surfaces of the valve body and valve carrying the diaphragm under pressure.

For this purpose the outer edge of the swivelling member and the inner edge of the frame opening are conveniently designed as a polygon. Each of the polygon sides of the swivelling member or of the frame opening or corresponding parts of the diaphragm is conveniently provided with bridging elements fixed in such a manner that they can swivel and/or move freely within certain limits. On top of the bridging elements i.e. on the side of the high pressure, a spring tempered primary sealing member may be fixed which might consist of strips of suitable elastic metal sheeting each having a greater thickness than the sealing diaphragm and a larger area than the bridge-piece itself, when closed, with one margin on the swivelling member and with the other on the frame or dividing plate. These spring-tempered strips will settle tightly under pressure on their supports and will assure that the sealing faces of the bridge-pieces and their adjacent components, even when under pressure, and when misaligned to a certain degree, will offer a flat or an only very gradually curved surface which is virtually even and which can accommodate the actual sealing diaphragm under pressure without causing the excessive stress.

The invention will be further described with reference to the accompanying drawings, in which:

FIGURE 3 is a sectional view taken on the line III—III of FIGURE 2.

FIGURE 4 is an enlarged view of the main door of FIGURE 3 in the closed position.

FIGURE 10a is a similar view to FIGURE 10 but illustrating some distortion of the valve body.

FIGURE 15 is a view corresponding to FIGURE 10 but of a further embodiment.

FIGURE 16 is a view of a part of a further embodiment, and

FIGURE 17 is a section on the line XVII—XVII of FIGURE 16.

Figure 1:
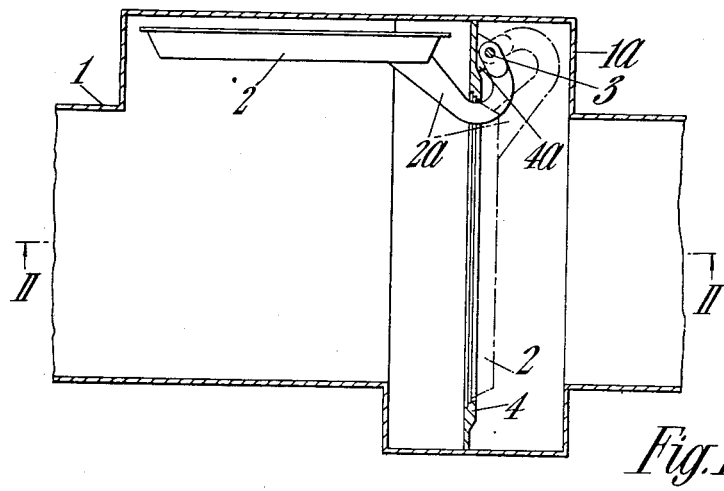
FIGURE 1 is a sectional view taken on the line I—I of FIGURE 2 of an embodiment.

The duct 1 is formed with an enlarged section 1a to take the swivel valve 2 and the auxiliary mechanism. Valve 2 is provided with three hinge members 2a which are secured to a hinge pin 3 which is held by bearings 4a secured to a dividing plate 4. In FIGURE 1 the valve 2 is shown open in the full line and closed in phantom lines. Hinge pin 3 is extended so as to be driven by electric motor 5 mounted on the outside of the enlarged duct section 1a.

Mounted in the top of the enlarged duct section 1a is a curtain roller 6 carrying a curtain 7 therearound of flexible heat resisting sheet of, say 8 mu thickness; secured at the top edge to the dividing plate 4 and adapted to be lowered by lowering wires 8 passing round pulleys 9 which are secured on a rod 10 driven from an electric motor 11 mounted on a bracket 12 secured to the outside of the enlarged section 1a of the duct.

The raised line position of curtain roller 6 is shown in the full line and the lowered position is shown in phantom.

Figure 2:
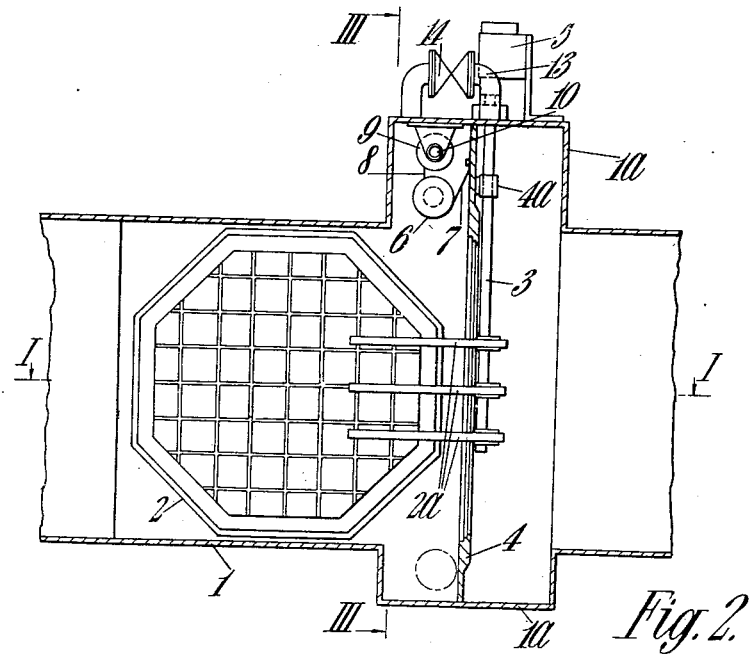
FIGURE 2 is a sectional view taken on the line II—II of FIGURE 1.
Figure 5:
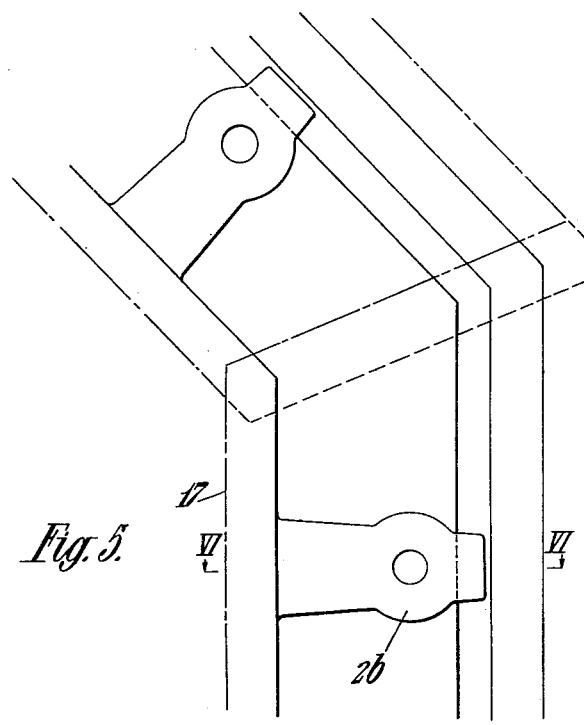
FIGURE 5 is an enlarged detail view of FIGURE 4.
Figure 6:
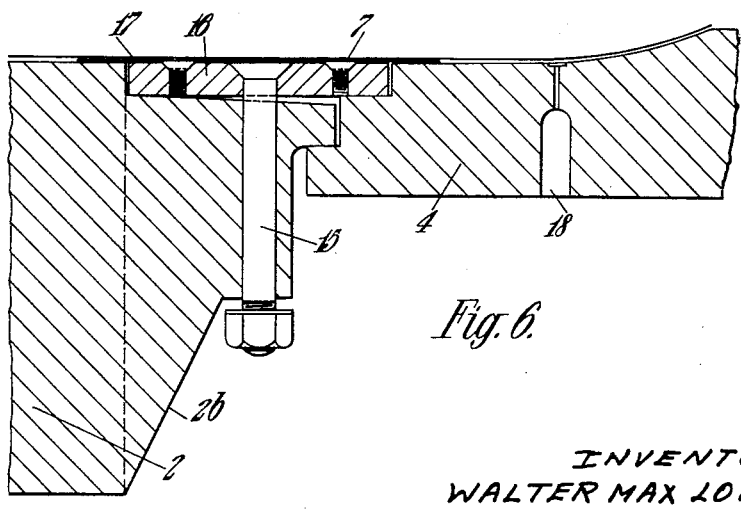
FIGURE 6 is a sectional view taken along the line VI—VI of FIGURE 5.
Figure 8:
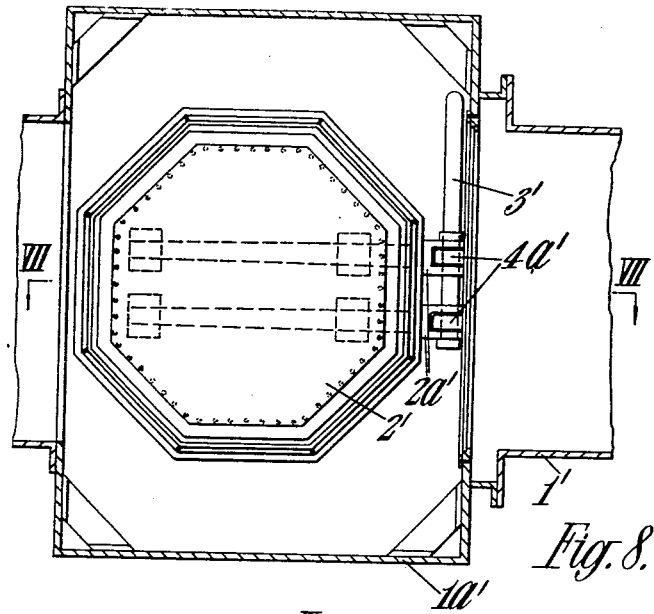
FIGURE 8 is a sectional view taken on the line VIII—VIII of FIGURE 7.

For equalising the pressure before opening the duct a tube 13 is provided between opposite sides of the dividing plate 4, on the outside of the top of the enlarged section 1a of the duct 1, and in this tube is provided a pressure equalising valve 14. As shown in FIGURES 2 and 3, the dividing plate 4 has an octagonal aperture of stepped form.

The swivel valve 2 is also octagonal and normally engages on the bottom step of the aperture by means of thirty-two projecting web members 2b. Through each of the web members passes a bolt 15 and the bolts 15 of the four web members on each of the octagonal sides of the door carry a bridge-piece 16.

The free longitudinal movement of the bolts 15 is such that up to a given amount of distortion the outer sides of the bridge-piece rest on the second step in the dividing plate aperture.

Rivetted to the outer side of each of the bridge-pieces 16 is a flexible sheet of heat-resistant material 17, of say, 10 mu thickness. These sheets overlap with the body of the door and also with the edge of the dividing plate, and also overlap each other at the corners of the octagonal door and dividing plate aperture.

Suction seal apertures 18 are provided around the curved annular inner edge of the dividing plate to aid the curtain 7 to be closed over the face of the dividing plate.

Figure 7:
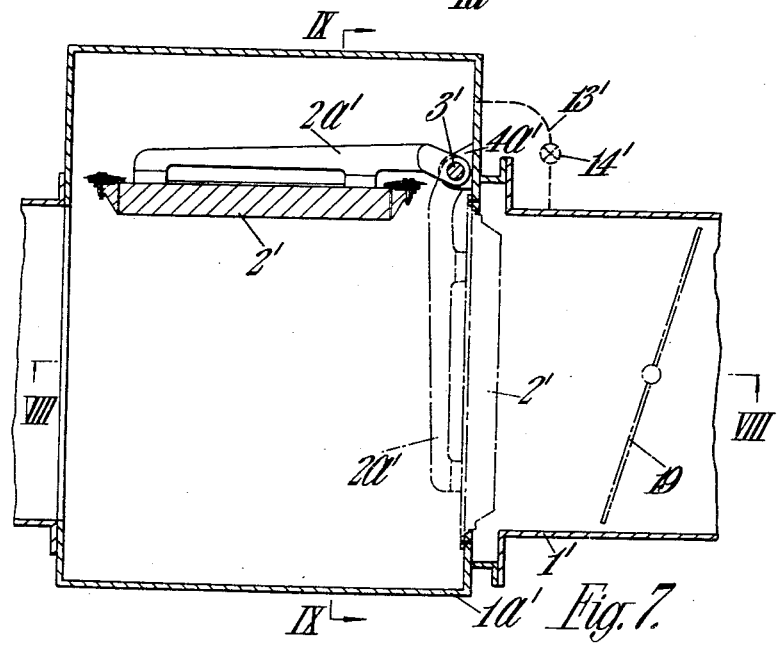
FIGURE 7 is a sectional view taken along the line VII—VII of FIGURE 8 illustrating a further embodiment.

In FIGURES 7 to 10, the duct 1' and duct section 1a' are as before, valve 2' is provided with two hinge members 2a' which are secured to hinge pin 3' which is supported on spaced bearings 4a' to the side of the enlarged section 1a'. In FIGURE 7 the valve 2' is shown open in the full line and closed in phantom.

An equalising tube 13' shown diagrammatically, and valve 14' are provided as before and additionally a butterfly valve 19 is provided in duct 1' on the low pressure side of swivel valve 2.

Figure 10:
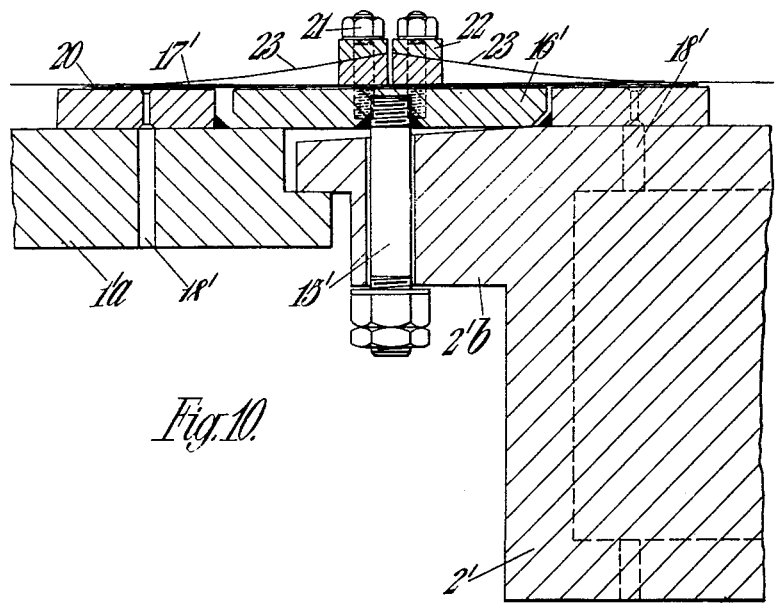
FIGURE 10 is an enlarged sectional view taken on the line X—X of FIGURE 9 with the door in the closed position.
Figure 9:
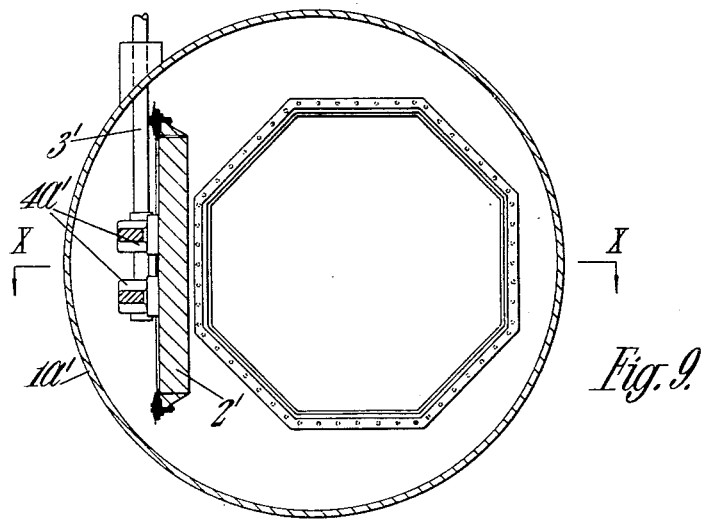
FIGURE 9 is a sectional view taken on the line IX—IX of FIGURE 7.

As shown in FIGURE 10, valve 2' is formed with webs 2'b with bolts 15' therethrough supportng bridge-pieces 16' as before. Each bridge-piece carries a flexible spring sheet of heat-resisting material 17' as before. The valve 2' has also secured thereto over all the bridge-pieces an annular octagonal (or circular) strip 20 or diaphragm of thinner heat-resisting flexible material by means of pairs of bolts 21 and pillars 22. The pairs of pillars 21 also carry pairs of finger-shape flexible springs 23 which bear down on the strip 20 one on each side.

The plate of duct section 1'a on which the valve bears and the valve itself, are provided with suction seal apertures 18'.

In operation, when the valve 2. 2' is closed the bridge-pieces 16, 16' automatically adjust themselves to any distortion and rest on the dividing plate 4 or wall of section 1'a whichever is applicable. The spring sheets 17, 17' overlap at the ends; at their sides they bridge the gap between the bridge-piece and door and bridge-piece and dividing plate or wall of enlarged duct section and are strong enough to resist (over the short gaps) the very high pressures which may occur.

The thinner sheet 7 or 20 forms the diaphragm and is drawn down by suction at the seal apertures 18 or 18' and sits down over the door, dividing plate or enlarged section wall, and sheets 17 and 17' and these provide a support for the curtains 7 or thin sheet 20 which can follow to give an efficient seal.

The thin sheet could not, of course, resist the high pressure unaided.

If desired, the thin sheet of the second embodiment, instead of being annular, could completely cover the door, in which case the hinging arrangement would be of the kind described in connection with the first embodiment and the inner suction seals would be dispensed with.

FIGURE 10a shows how when the valve body 1'a is distorted in both the vertical and lateral directions in relation to the valve disc 2' the bridge-piece 16' nevertheless levels out the distortion and forms a firm support for the strip 20.

Figure 11:
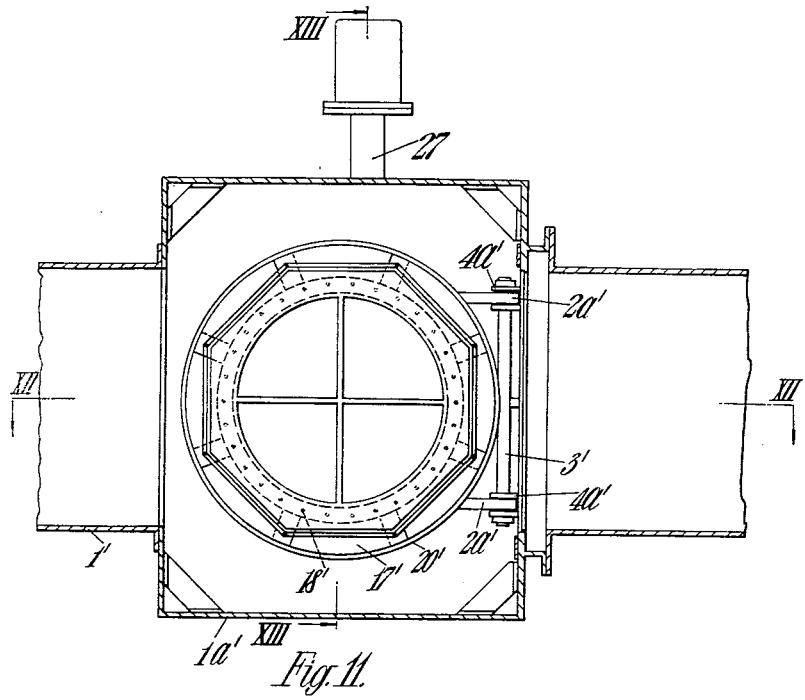
FIGURE 11 is a sectional view taken on the line XI—XI of FIGURE 13 of a further embodiment which is a modification of that of FIGURES 7 to 10 inclusive.
Figure 12:
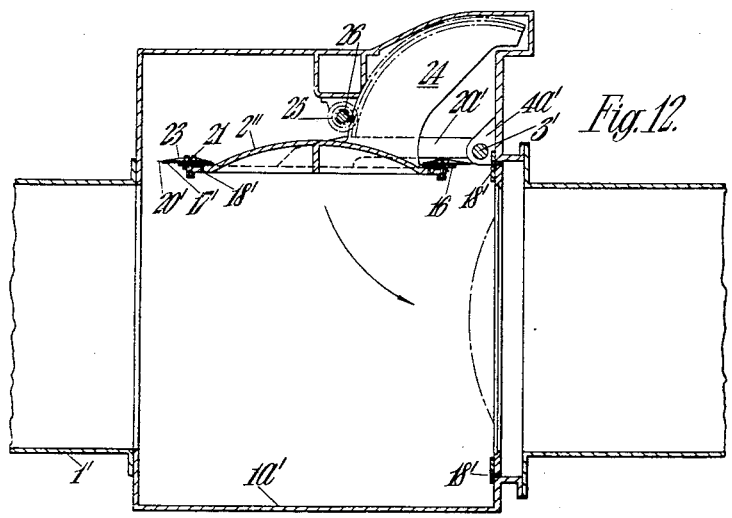
FIG. 12 is a sectional view taken on the line XII—XII of FIGURE 11.
Figure 13:
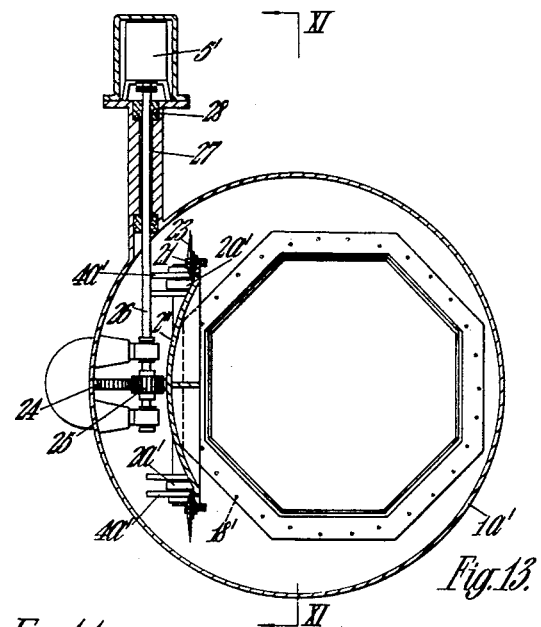
FIGURE 13 is a sectional view taken on the line XIII—XIII of FIGURE 11.

The embodiment of FIGURES 11 to 13 is similar to that of FIGURES 7 to 10 except that a circular metal annulus strip 20' is used for the diaphragm and overlapping part circular strips 17' for the spring sheets bridging the gap.

Valve disc 2" is a circular dished form with a polygonal periphery to which the bridge-pieces 16 are secured as before.

A quadrant rack 24 is secured to the valve disc 2" whereby the valve may be opened and closed by rotation of pinion 25 engaging the rack 24.

Pinion 25 is driven from a shaft 26 which extends to an electric motor 5' over a cooling sleeve 27 with flow restricting glands 28.

The motor 5' is totally enclosed.

Figure 14:
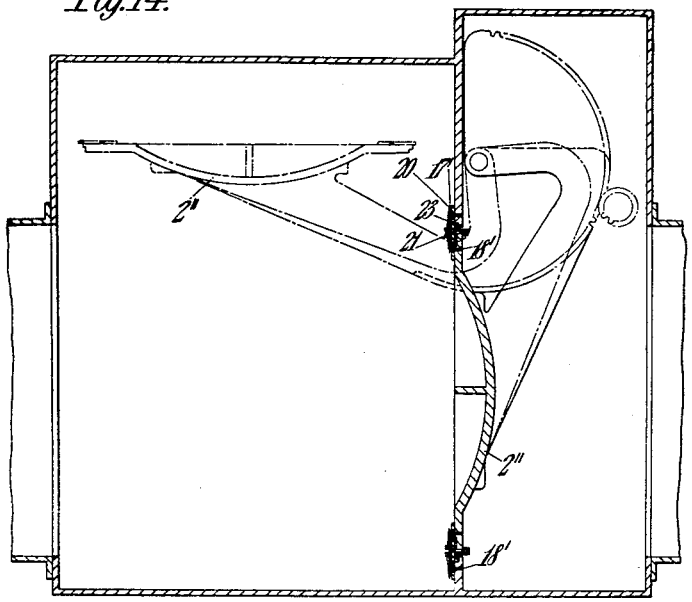
FIGURE 14 is a view corresponding to FIGURE 12 of a modification thereof.

The quadrant and pinion operating gear might be fixed at the low pressure side, if desired, as shown in FIGURE 14 instead of as shown in FIGURE 12 on the high pressure side.

In FIGURE 15 those parts which are identical with FIGURE 10 have the same references. The octagonal or circular strip 20, however, has been replaced by an annular strip 30. The right-hand bolt 21 and pillar 22 is dispensed with and instead a pillar 31 and bolt 32 secure the inner edge of the annular strip 30 directly on to the valve 2' eliminating the valve suction seal 18' of FIGURE 10.

In the embodiment of FIGURES 16 and 17 the valve body 33 with its suctional seal 33a and the valve disc 34 are generally similar in construction to the corresponding parts of FIGURE 15. The annular strip 5 is also similar to strip 30 of FIGURE 15 and is secured in a similar way to the valve disc by clamping bar 36 and bolts 37. Instead of the bridge-piece 16 or 16' of the earlier described embodiments there is provided a bridge-piece 38 rivetted by spaced rivets 39 to the strip 35 and comprising a plurality of stepped sheet metal laminations (here two), the lateral edges of which abut on sloping faces of the valve body and valve disc respectively. Extensions 36a of the clamping bar are provided to assist in holding down the strip 35.

Various other modifications may be made within the scope of the invention. Thus in FIGURES 6, 10, 10a and 15, the valve and valve body references could be considered as being interchanged so that the bridging elements and diaphragm are mounted on the valve body instead of on the valve.

We claim:

1. A gas tight closure device for ducts of large cross-section, carrying gas under pressure, comprising a stationary frame member having an upstream or high pressure side and a downstream side and defining an opening of a size generally corresponding to the cross-section of the duct; a closure or door member with upstream and downstream sides being movably mounted for alternate movement into closed and open positions relative to said frame member and adapted to be seated in its closed position within said frame member; a plurality of generally flat bridging elements yieldingly mounted on one of said closure and frame members for engagement with the other of said members, said bridging elements having upstream and downstream surfaces and a thickness such that their upstream surface is substantially flush with an adjacent surface portion of the upstream side of said other of said frame and closure members, when said closure member is in its closed position, independently of level differences between said frame and closure members; and diaphragm means of thin flexible flat sheet metal overlying said flush surfaces in said closed position and providing a continuous seal between said closure and frame members and said bridging elements.

2. A gas tight closure device for ducts of large cross-section, carrying gas under pressure, comprising a stationary frame member having an upstream or high pressure side and a downstream side and defining an opening of a size generally corresponding to the cross-section of the duct; a closure or door member with upstream and downstream sides being movably mounted for alternate movement into closed and open positions relative to said frame member and adapted to be seated in its closed position within said frame member; a plurality of generally flat bridging elements yieldingly mounted on one of said closure and frame members for engagement with the other of said members, said bridging elements having upstream and downstream surfaces and a thickness such that their upstream surface is substantially flush with an adjacent surface portion of the upstream side of said other of said frame and closure members, when said closure member is in its closed position, independently of level differences between said frame and closure members; and diaphragm means of thin flexible flat sheet metal overlying said flush surfaces in said closed position and providing a continuous seal between said closure and frame members and said bridging elements; and a plurality of suction seal apertures peripherally below said diaphragm means.

3. A gas tight closure device for ducts of large cross-section, carrying gas under pressure, comprising a stationary frame member having an upstream or high pressure side and a downstream side and defining an opening of a size generally corresponding to the cross-section of the duct, a closure or door member with upstream and downstream sides being movably mounted for alternate movement into closed and open positions relative to said frame member and adapted to be seated in its closed position within said frame member; a plurality of generally flat bridging elements yieldingly mounted on one of said closure and frame members for engagement with the other of said members, said bridging elements having upstream and downstream surfaces and a thickness such that their upstream surface is substantially flush with an adjacent surface portion of the upstream side of said other of said frame and closure members, when said closure member is in its closed position, independently of level differences between said frame and closure members; substantially flat flexible spring sheets secured to the upstream surface of said bridging elements and extending over said adjacent surface portion and any gap between said bridging elements and said adjacent surface portions; and diaphragm means of thin flexible sheet metal overlying and extending beyond said flat spring sheets in said closed position and providing a continuous seal between closure and frame members.

4. A gas tight closure device for ducts of large cross-section carrying gas under pressure, comprising a stationary frame member having an upstream or high pressure side and a downstream side and defining an opening of a size generally corresponding to the cross-section of the duct, a closure or door member with upstream and downstream sides being hingedly movably mounted for alternate movement into closed and open positions relative to said frame member and adapted to be seated in its closed position within said frame member; a plurality of generally flat bridging elements yieldingly mounted on said closure member for engagement with said frame member, said bridging elements having upstream and downstream surfaces and a thickness such that their upstream surface is substantially flush with an adjacent surface portion of the upstream side of said frame member, when said closure member is in its closed position, independently of level differences between said frame and closure members; and diaphragm means of thin flexible metal overlying said flush surfaces in said closed position.

5. A gas tight closure device for ducts of large cross-section carrying gas under pressure, comprising a stationary frame member having an upstream side and a downstream side and defining an opening of a size generally corresponding to the cross-section of the duct, a closure or door member with upstream and downstream sides being hingedly mounted for alternate movement into closed and open positions relative to said frame member and adapted to be seated in its closed position within said frame member; a plurality of generally flat bridging elements yieldingly mounted on said closure member for engagement with said frame member, said bridging elements having upstream and downstream surfaces and a thickness such that their upstream surface is substantially flush with an adjacent surface portion of the upstream side of said frame member, when said closure member is in its closed position, independently of level differences between said frame and closure members; substantially flat flexible spring sheets secured to the upstream surface of said bridging elements and extending over said adjacent surface portions and any gap between said bridging elements and said adjacent surface portions, and diaphragm means of thin flexible sheet metal overlying and extending beyond said flat spring sheets in said closed position and providing a continuous seal between the closure and frame members.

6. A gas tight closure device as claimed in claim 4, in which suction seal means are provided adapted to assist the sealing effect of the diaphragm means in the closed position of the closure member.

7. A gas tight closure device as claimed in claim 4, in which the downstream side of the frame member is provided with an inwardly projecting rim having a shoulder, the closure member is provided peripherally with a plurality of web members adapted to be seated on said shoulder, and the bridging elements are mounted for swivelling movement on bolts slidable within said web members.

8. A gas tight closure device as claimed in claim 7, wherein the diaphragm means are attached to the bridging elements and consists of sheet metal having a spring temper.

9. A gas tight closure device as claimed in claim 1, in which the bridging elements are of stepped laminated form.

10. A gas tight closure device as claimed in claim 3, in which the closure member and the opening in the frame member are of corresponding polygonal form and the flat flexible spring sheets are in the form of narrow strips.

11. A gas tight closure device as claimed in claim 3, in which the closure member is laterally pivoted.

References Cited in the file of this patent

UNITED STATES PATENTS

| | | |
|---|---|---|
| 1,847,385 | Dangler | Mar. 1, 1932 |
| 2,079,164 | Glab | May 4, 1937 |
| 2,227,767 | Smith | Jan. 7, 1941 |
| 2,741,264 | Leonard | Apr. 10, 1956 |
| 2,893,685 | Van Camp | July 7, 1959 |

FOREIGN PATENTS

| | | |
|---|---|---|
| 27,909 | Great Britain | of 1908 |
| 739,290 | Germany | of 1943 |